No. 763,781. PATENTED JUNE 28, 1904.
W. J. NICHOLSON.
CORN SHOCK BINDING DEVICE.
APPLICATION FILED AUG. 10, 1903.
NO MODEL.

Witnesses:
H. A. Lingle.
P. A. Hickey.

Inventor:
Wm. J. Nicholson
By F. G. Fischer
Atty.

THE NORRIS PETERS CO., PHOTO-LITHO., WASHINGTON, D. C.

No. 763,781. Patented June 28, 1904.

UNITED STATES PATENT OFFICE.

WILLIAM J. NICHOLSON, OF PAOLA, KANSAS.

CORN-SHOCK-BINDING DEVICE.

SPECIFICATION forming part of Letters Patent No. 763,781, dated June 28, 1904.

Application filed August 10, 1903. Serial No. 168,895. (No model.)

*To all whom it may concern:*

Be it known that I, WILLIAM J. NICHOLSON, a citizen of the United States, residing at Paola, in the county of Miami and State of Kansas, have invented certain new and useful Improvements in Corn-Shock-Binding Devices, of which the following is a specification.

My invention relates to a corn-shock-binding device; and my object is to provide means whereby one man may bind corn-shocks more compactly and quickly than this work has heretofore been accomplished by hand.

The essential features of the invention reside in a frame to which one end of the binding twine or wire is attached, a drum mounted on the frame upon which the twine is wound after being passed around the shock, and means for holding the twine from slipping while its ends are being tied into a knot, all being arranged substantially as hereinafter described.

Minor features are added to the above elements for convenience in manipulating the device, and in order that the invention may be readily understood reference will now be made to the accompanying drawings, in which—

Figure 1:
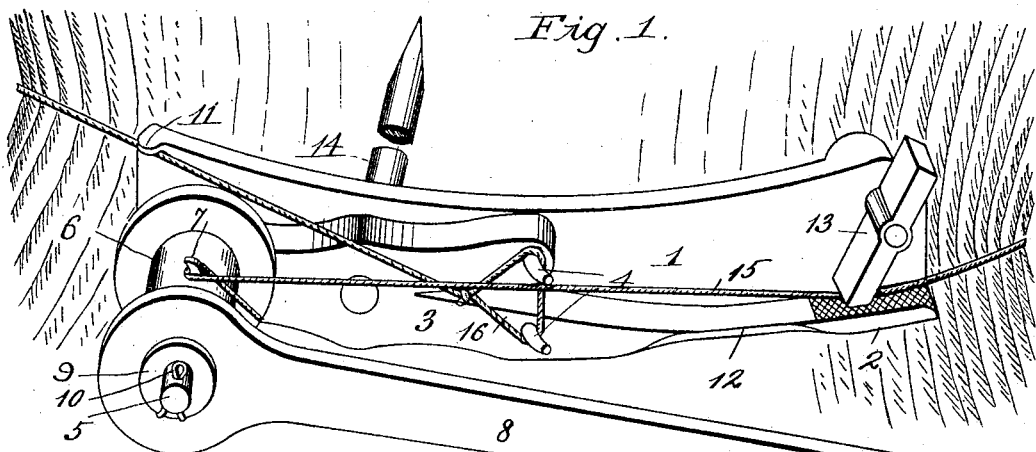
Figure 2:
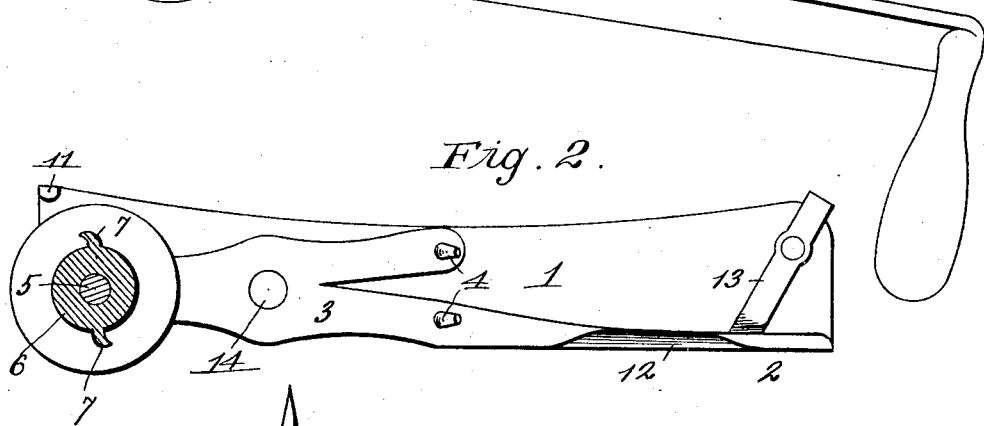
Figure 3:
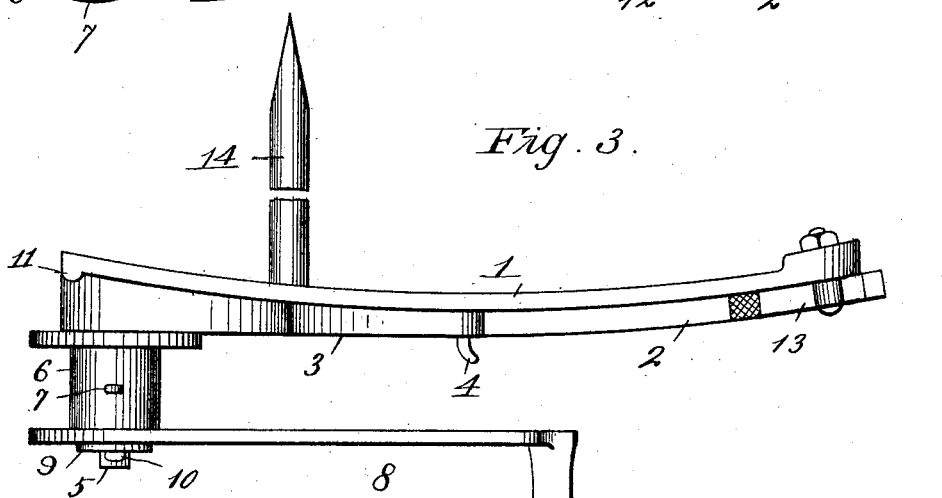

Figure 1 represents a perspective view of the device in an operative position. Fig. 2 is a front elevation of the device with the drum in cross-section. Fig. 3 is a plan view of the device.

Similar reference-numerals designate similar parts throughout the several views.

In carrying out the invention I employ a frame 1, which is preferably curved in plan view to conform with the curvature of the shock. Said frame is braced at its lower portion with a forwardly-extending marginal flange 2 and a reinforcement 3, from the inner end of which latter a pair of hooks 4 project. These hooks open away from the drum and are arranged out of alinement with the drum for a purpose that will be later specified.

5 designates a stub-shaft projecting from the opposite end of the reinforcement to receive a drum 6, having oppositely-disposed peripheral hooks 7 and a crank-handle 8 for rotating the drum, which latter is retained upon its shaft by a washer 9 and a cotter-pin 10. The upper end of the frame carrying the drum is provided with a lip 11 to prevent the binding-twine from slipping therefrom when passing it around the shock. Flange 2 is sharpened near its outer end to present a cutting edge 12.

13 designates a dog pivotally secured to one end of the frame above flange 2, and its under side is roughened and adapted to contact with the upper roughened surface of said flange.

14 designates a supporting-pin projecting from the rear side of frame 1 and preferably made removable, so the device will not occupy much space in transit.

In operation the supporting-pin is thrust into the shock to hold the device thereon and leave both hands of the operator free to manipulate the binding twine or wire 15, one end of which is formed into a loop 16, that is slipped over hooks 4. The twine is then passed around the shock, brought between the lower end of the dog and the marginal flange, passed between hooks 4, and attached to either of hooks 7 on the drum, upon which the twine is then wound by turning crank 8 in the proper direction. After the wire has thus been drawn to a sufficient tension around the shock the crank is turned backward to slacken the twine, which is then severed by drawing it across the cutting edge 12. The severed end is then brought back and tied to the loop. When the drum is turned backwardly to loosen the end of the twine, the tension on that portion of the latter extending around the shock is maintained by dog 13, which presses it against the roughened surface of the marginal flange with sufficient force to prevent it from slipping backward. After the ends of the twine have been tied into a knot the device may be readily removed from the shock by pressing the end containing lip 11 inwardly against the shock and slipping the twine up over said lip.

The arrangement of hooks 4 is such that loop 16 will be held wide open, thus facilitating the tying of the free end of the cord thereto. Moreover, these hooks serve as stops and, together with lip 11, prevent the frame from making a half-rotation while the tension is being applied to the cord. Inasmuch as the hooks open away from the drum, the operator will always pass the twine around the shock, as indicated in Fig. 1. This brings the free end of the cord well past the tying-hooks and insures a sufficient length for tying. Further, it will be noted that all the mechanism for tying, holding, and cutting the cord is at one end of the frame. Thus after the twine has been sufficiently tightened the drum and crank will not be in the way of the operator during the following manipulations.

From the above description it is apparent that I have produced a simple device which is economical to manufacture and thoroughly effective for the purpose intended. It is also obvious that changes may be made in minor details without affecting the spirit and scope of the invention.

Having thus described my invention, what I claim, and desire to secure by Letters Patent, is—

1. In a device of the character described, the combination with a frame, of a winding-drum thereon, cord-clamping mechanism also mounted on the frame, and a securing-hook intermediate said drum and cord-clamping mechanism.

2. In a device of the character described, the combination with a frame, of a winding-drum thereon, cord-clamping mechanism also mounted on the frame, and a securing-hook intermediate said drum and cord-clamping mechanism, said hook opening away from the drum.

3. In a device of the character described, the combination with a frame; of a winding-drum at one end thereof, cord-clamping mechanism at the other end comprising a flange projecting from the frame and a dog, a hook intermediate said drum and cord-clamping mechanism, and a cutting edge also intermediate the drum and clamping mechanism.

4. In a device of the character described, the combination with a frame, a drum thereon, and cord-clamping mechanism also mounted on the frame; of a pair of hooks intermediate said drums and cord-clamping mechanism.

5. In a device of the character described, the combination with a frame and a drum at one end thereof; of a flange and dog at the other end of the frame, a pair of hooks intermediate the ends of the frame, and a lip projecting from the frame adjacent the drum.

In testimony whereof I affix my signature in the presence of two witnesses.

WILLIAM J. NICHOLSON.

Witnesses:
   JAMES B. NORTON,
   VET WYGAL.